ated June 14, 1966

3,256,248
VINYL N-HETEROCYCLIC AMINES AND POLYMERS THEREOF

Lieng-Huang Lee, Midland, Mich., assignor to The Dow Chemical Company, Midland, Mich., a corporation of Delaware
No Drawing. Filed Feb. 4, 1963, Ser. No. 256,101
8 Claims. (Cl. 260—77.5)

This invention relates to new compositions of matter and to methods of making the same. More particularly, this invention relates to vinyl N-heterocyclic carbamates, methods for maing vinyl N-heterocyclic carbamates and to polymers of vinyl N-heterocyclic carbamates.

The present invention provides new and useful compounds having the general formula

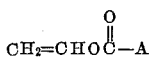

in which —A is the residue obtainable by removing the N-hydrogen atom from an N-heterocyclic secondary amine having the formula HA.

These compounds can be made according to the invention by reacting a vinyl haloformate with an N-heterocyclic secondary amine. In the reaction, the N-heterocyclic secondary amine selected is determined by the structure of the vinyl N-heterocyclic carbamate desired. The halogen in the vinyl haloformate is preferably selected from the group consisting of chlorine, bromine and iodine. The vinyl haloformate is conveniently vinyl chloroformate. An excess, on a molar basis, of the N-heterocyclic secondary amine over the vinyl haloformate reactant is usually used in the reaction. A molar ratio of 1.5 or more, e.g., 1.8:1, of N-heterocyclic secondary amine to vinyl haloformate in the starting material is advantageous. The reaction is preferably carried out at below room temperatures, i.e., at a temperature of 10° C. or lower, beneficially at a temperature between —5° and —25° C., for example, —10° C. The products are stable on storage without an inhibitor and on distillation under vacuum.

As indicated above, the new compounds of this invention are made by reacting a vinyl haloformate having the formula

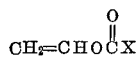

in which X is a halogen such as chlorine, bromine or iodine with an N-heterocyclic secondary amine having the formula HA in which the H is hydrogen attached to the nitrogen atom of the N-heterocyclic secondary amine. Representative illustrative specific examples of such N-heterocyclic secondary amines are piperidine, pyrrol, 2-pyrroline, 3-pyrroline, pyrrolidene, ethylene imine, 3-pyrrolidinone, pyrazole, 1,2,3-triazole, 1,2,4-triazole, indole, indoline, carbazole, morpholine, 3-hydro-1,2,3-oxathiazole, purine, hexamethylene imine, piperazine, tetrazole and the like.

The vinyl N-heterocyclic carbamates of this invention have a pleasant odor and can be employed as odoriferous ingredients in reodorizers. In addition, the compounds of this invention exhibit biological activity. For example, at a concentration of 50 pounds per acre, they kill weeds and crabgrass seedlings. The compounds of this invention can also be polymerized to form moldable polymers as will appear hereinafter.

According to the present invention, the vinyl N-heterocyclic carbamates of this invention can be polymerized to form polymers which can be molded into useful articles such as blocks, sheets, films and the like by conventional techniques. The polymer can be a homopolymer of a vinyl N-heterocyclic carbamate or a copolymer of mixtures of vinyl N-heterocyclic carbamates, or a copolymer of a mixture of one or more vinyl N-heterocyclic carbamaes with one or more ethylenically unsaturated monomers copolymerizable therewith. Typical monomers copolymerizable with vinyl N-heterocyclic carbamates are styrene and monomers copolymerizable with styrene. Representative illustrative examples of such ethylenically unsaturated compounds are the vinyl esters such as vinyl acetate, vinyl butyrate and the like; vinylidene compounds such as vinylidene chloride and the like; acrylic and methacrylic acids, acrylates and methacrylates such as ethyl acrylate and methyl methacrylate; acrylonitrile, styrene and substituted styrenes, acrylamides such as N-isopropyl acrylamide and the like; gumaramides, fumaramates; citraconamides; citraconamates; maleamates; maleamides, ethylene, propylene, 1-butene and similar well known monoethylenically unsaturated copolymerizable materials.

Throughout this specification, parts and percentages are parts and percentages by weight unless otherwise specified. The examples which follow are illustrative of the present invention but the invention is not limited to the details thereof.

Example I

In a vessel 43 grams of piperidine are dissolved in 50 milliliters of methylene chloride. There is then added to the solution, with stirring, 26.6 grams of vinyl chloroformate. The temperature of the contents of the vessel is maintained at —10° C. After washing with dilute hydrochloric acid (2 milliliters of HCl in 50 milliliters of water), the mixture is dried by adding 5 grams of anhydrous sodium sulfate and is filtered. Vinyl N-piperidinyl carbamate (24 grams) is then recovered from the filtrate by distillation. It has a boiling point of 68° to 71° C. at 0.35 mm. Hg; $d_4^{25}=1.1736$ and $N_D^{25}=1.4768$.

Example II

Fourteen grams of pyrrol is mixed with 21.6 grams of vinyl chloroformate and 20 grams of triethylamine (as an HCl acceptor) in 50 milliliters of methylene chloride. Vinyl N-pyrrolyl carbamate (10.5 grams) is separated from the reaction mixture by distillation at a temperature of 78° C. and a pressure of 30 mm. Hg. The product is purified by careful redistillation to yield a colorless liquid.

In a manner similar to the foregoing examples, any of the vinyl haloformates indicated above can be reacted with other N-heterocyclic secondary amines as referred to hereinabove to produce vinyl N-heterocyclic carbamates. The products have similar properties and utilities, for example, they can be polymerized as indicated below.

Example III

Four grams of vinyl N-piperidinyl carbamate is placed in a glass tube with 0.02 gram of α,α'-azobis(isobutyronitrile) as a catalyst. The tube is sealed under nitrogen. Polymerization takes place at 60° to 61° C. for two days. The viscous product is devolatilized and a solid, moldable resin is recovered.

Example IV

Into a glass test tube is placed four grams of vinyl N-pyrrolyl carbamate along with 0.02 gram of α,α'-azobis(isobutyronitrile). The tube is then sealed in an atmosphere of nitrogen. The tube and its contents are maintained at a temperature of 60° C. for two days. A viscous product results from which the voltatile material is then removed leaving a solid resin which is moldable into films, fibers and the like by conventional techniques.

In a manner similar to Examples III and IV, the other vinyl N-heterocyclic carbamates of this invention can be polymerized alone or in admixture with other ethylenically unsaturated monomers as hereinabove indicated in the presence of a polymerization-favoring catalyst such as that employed in the examples or one of the so-called per-catalysts such as the peroxides, for example, hydrogen peroxide and benzoyl peroxide, or such as the persulfates, for example, potassium persulfate and the like, to produce solid resins which can be molded into useful shaped articles.

That which is claimed is:

1. A compound having the general formula

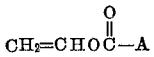

in which A denotes the residue of a N-heterocyclic secondary amine formed by loss of N-hydrogen and bonded through nitrogen to the remainder of the molecule of which it forms a part.

2. Vinyl N-piperidinyl carbamate.
3. Vinyl N-pyrrolyl carbamate.
4. A polymer of a monomeric material having the general formula

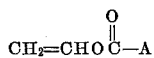

in which A denotes the residue of a N-heterocyclic secondary amine formed by loss of N-hydrogen and bonded through nitrogen to the remainder of the molecule of which it forms a part.

5. A polymer of a monomeric material having the formula:

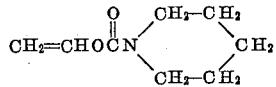

6. A polymer of a monomeric material having the formula:

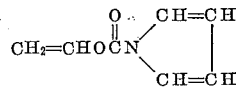

7. A homopolymer of a monomeric material having the general formula

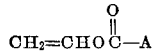

in which A denotes the residue of a N-heterocyclic secondary amine formed by loss of N-hydrogen and bonded through nitrogen to the remainder of the molecule of which it forms a part.

8. A copolymer of a monoethylenically unsaturated polymerizable monomer and a monomeric material having the general formula

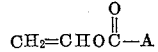

in which A denotes the residue of a N-heterocyclic secondary amine formed by loss of N-hydrogen and bonded through nitrogen to the remainder of the molecule of which it forms a part.

References Cited by the Examiner

UNITED STATES PATENTS

| | | | |
|---|---|---|---|
| 2,806,838 | 9/1957 | Melamed | 260—77.5 |
| 2,967,880 | 1/1961 | Finke et al. | 260—482 |
| 3,022,293 | 2/1962 | Miller | 260—326.3 X |
| 3,072,657 | 1/1963 | Boenig et al. | 260—77.5 X |

LEON J. BERCOVITZ, *Primary Examiner.*

J. J. KLOCKO, *Assistant Examiner.*